Nov. 6, 1928.

C. T. SIEBS

HEATER

Filed Nov. 14, 1924     2 Sheets-Sheet 1

1,690,379

Inventor
Claude T. Siebs
by H. A. Pattison
Atty.

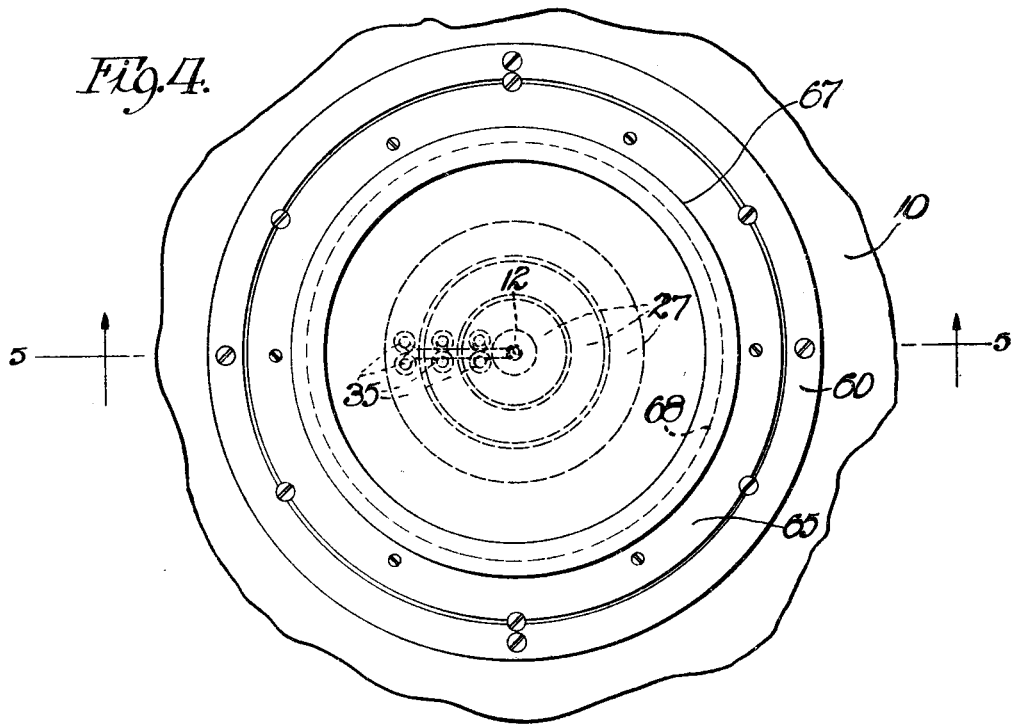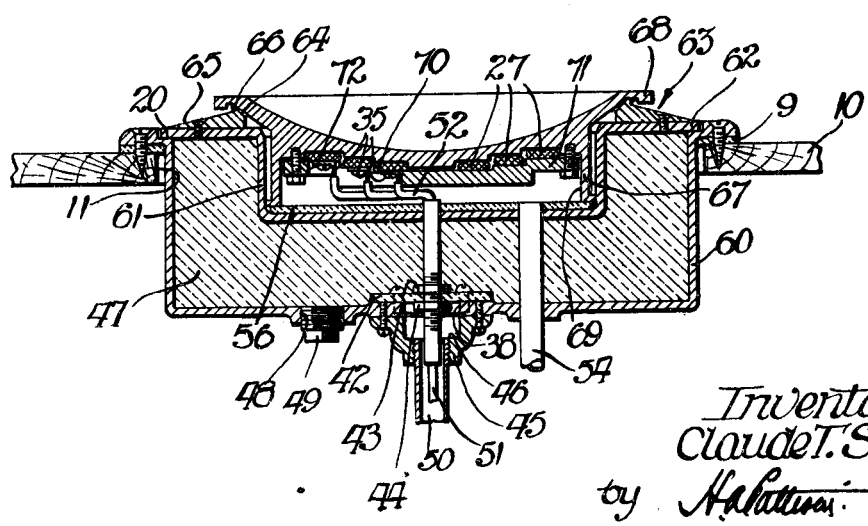

Patented Nov. 6, 1928.

1,690,379

UNITED STATES PATENT OFFICE.

CLAUDE THEODORE SIEBS, OF RIVERSIDE, ILLINOIS, ASSIGNOR TO WESTERN ELECTRIC COMPANY, INCORPORATED, OF NEW YORK, N. Y., A CORPORATION OF NEW YORK.

HEATER.

Application filed November 14, 1924. Serial No. 749,829.

This invention relates to heaters, and more particularly to electrically heated devices.

In some types of heating devices, particularly electrically heated containers for heating fluids of the type disclosed and claimed in Patent 1,386,705, issued to J. T. Griffin and W. A. Timm on August 9, 1921, it is desirable to protect the electrical heating element and electrical connections therefor from the deleterious effects of fluids, thereby prolonging the life of the heating device.

An object of the invention is to provide an improved heater of simple and inexpensive construction.

In accordance with the features of the invention there is provided in one embodiment thereof an electrically heated device comprising a casing equipped with a cover provided with an opening which forms an ingress for a unit comprising a heating element, a solder melting or tinning pot and a stand upon which the element and pot rest. A metal receptacle is secured to the cover forming a closure for the opening in the cover and also a support for the heating element, pot, and stand. The terminals of the heating element protrude in an opening in the stand wherein they are secured to electrical conductors above the bottom of the metal receptacle. Associated with the metal receptacle is a drain pipe for permitting acid or any other similar substance which might seep through the cover into the metal receptacle to escape therefrom. This embodiment of the invention is particularly designed for the melting of solder to be used for tinning purposes.

In another embodiment or form of the invention there is provided a casing similar to the above mentioned casing. Positioned in the casing is a metal receptacle in which is located a plurality of staggered heating elements which are in direct contact with a bowl supporting member. This embodiment of the invention is particularly adapted for heating receptacles containing zinc chloride solutions, acids and the like.

Other objects and advantages of the invention will more fully appear from the following detailed description taken in connection with the accompanying drawings which illustrate two embodiments thereof, and in which—

Fig. 4 is a plan view embodied with the features of another form of the invention showing it applied to a bench, and Fig. 5 is a vertical cross sectional view taken on the line 5—5 of Fig. 4 looking in the direction indicated by the arrows.

Figure 1:
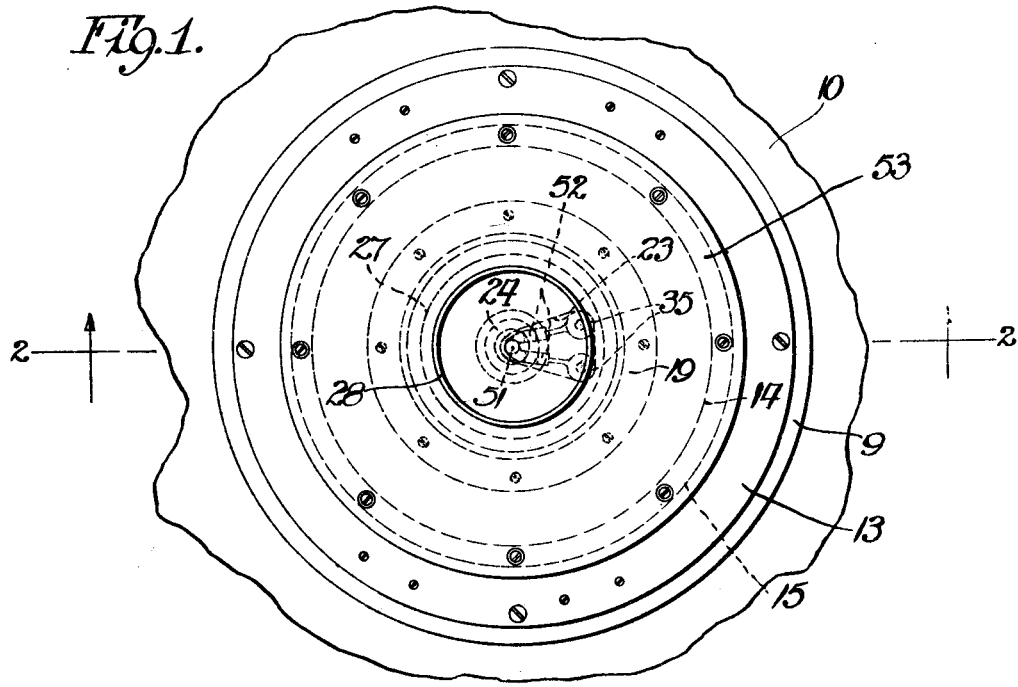
Fig. 1 is a plan view of an electric heating device embodied with the features of one form of the invention showing it applied to a bench.
Figure 2:
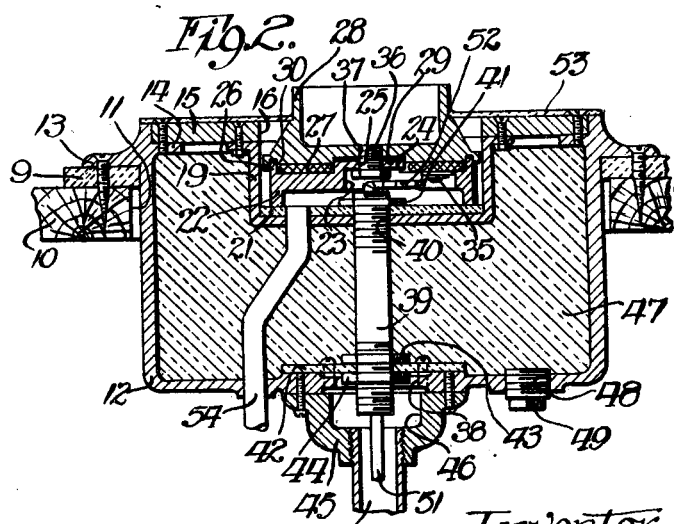
Fig. 2 is a vertical cross sectional view taken on the line 2—2 of Fig. 1 looking in the direction indicated by the arrows.

Referring now to the drawings in detail in which like reference numerals designate similar parts throughout the several views, 10 denotes a bench of any usual construction provided with a circular opening 11. A circular casing 12, preferably made of cast iron, is equipped with a flange 13 and is positioned in the opening 11. The flange 13 rests upon an asbestos ring 9, is suitably secured to the bench 10 and supports the casing 12 in such a manner that the major portion of the casing is located below the top surface of the bench 10. The casing 12 is cup-like in shape and is entirely open at the top. The upper part of the inner wall of the casing is equipped with an inwardly extending flange 14 upon which is supported and suitably secured a cover 15, preferably made of a heat insulator, such as asbestos board, and provided with a circular opening 16.

Figure 3:
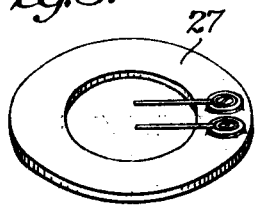
Fig. 3 is a perspective view of the heating element.

A metal receptacle 19 is suitably supported from the under surface of the cover 15 in such a manner that its interior is in alignment with the opening 16. A layer 21 of asbestos board rests on the bottom inside surface of the receptacle 19. Positioned in the interior of the receptacle 19 and resting on the asbestos board 21 is a stand 22 provided with an opening 23. The stand 22 is provided with a raised portion 24 having an opening 25, and an annular flange 26. Located intermediate the flange 26 and the portion 24 is a circular heating element 27 (Fig. 3) consisting of a ring of any suitable material and having embedded therein a predetermined number of turns of resistance wire. A circular solder or tinning pot 28 is located immediately above the heating element 27 and rests on the stand 22. The lower portion of the pot 28 is at its widest portion of approximately the same diameter as that of the interior of the receptacle 19, but has a smaller diameter at its top portion. The bottom of the pot 28 is provided with a circular recess 29 in which projects the portion 24. The bottom surface of the pot 28 is also provided with an annular groove 30 in which projects the annular flange 26. It will be noted that the heating element 27 is completely enclosed by the pot 28 and the stand 22 with the exception of the part exposed by the opening 23 through which terminals 35 protrude. A bolt 36 is threaded through the opening 25 and in an opening 37 in the pot 28, securing the pot 28 to the stand 22 with the heating element 27 therebetween. This enables the pot 28, the element 27, and the stand 22 to be removed as a unit.

The lower part of the casing 12 is provided with an opening 38 through which passes a tube 39 which extends upwardly into the center of the casing 12, through an opening 40 in the receptacle 19 and through the layer of asbestos 21. A nut 41 is threaded onto the upper part of the tube 39 and rests on the top of the asbestos board 21. Surrounding the lower portion of the tube 39 and completely closing the interior of the casing 12 from the exterior is an asbestos board 42 which is suitably secured to the casing 12. Resting on the asbestos board 42 and threaded onto the tube 39 is a lock nut 43. Threaded onto the lower portion of the tube 39, immediately below the asbestos board 42, is another lock nut 44 which tightly engages the underside of the asbestos board 42, maintaining the tube 39 in a perfectly rigid and vertical position. A circular element 45, having an opening 46, the center of which is in alignment with the center of the opening 38, is suitably secured to the bottom of the casing 12.

The interior of the casing 12 is filled with a heat insulator, preferably an infusorial earth 47 which may, whenever the device is to be disassembled, be withdrawn from the interior of the casing 12 through an opening 48, normally closed by a plug 49. Secured in the opening 46 is a conduit pipe 50 from which protrudes an electrical cord 51 which passes through the opening 46 into the tube 39 and emerges into the opening 23 in the stand 22 where conductors 52 thereof are suitably secured to the terminals 35 of the heating element 27. Connecting the interior of the receptacle 19 with the exterior of the casing 12 is a drain pipe 54, the purpose of which will be hereinafter described.

In order to minimize the chances of the operator becoming burnt, it is essential that some form of heat insulator, such as an asbestos board 53, be placed on top of the cover 15 around the pot 28. It will be noted that the board 53 completely covers the heating device, closing the opening 16 from the exterior and that it is secured on top of the device in a readily detachable manner.

The expansion and contraction of the metal parts of the heating device subjects the asbestos board 53 to stresses and strains which might produce cracks and crevices therein. In the process of tinning for which this embodiment of the invention is particularly designed, acids or other fluxing material may be used, which during the process might be splashed or spilled on the asbestos board 53. Any cracks or crevices so formed in the board 53 might permit any acid or similar material spilled thereon to seep through into the interior of the heating device.

In the present invention both the electrical connections and the heating element are elevated in such a manner that they will not be exposed to the deleterious effects of acid or fluxing material which might seep into the receptacle 19 of the heating device. Furthermore, any fluxing material which might seep through the cracks into the receptacle 19 and which is not evaporated, due to the intense heat, is drained therefrom by the pipe 54, thereby maintaining the internal parts of the heating device at all times comparatively dry and free from deleterious substances.

In the other embodiment or modified form of the present invention (Figs. 4 and 5), 60 denotes a casing, similar to the casing 12, which is mounted upon the bench 10 in the same manner as the casing 12. The upper part of the inner walls of the casing 60 is also provided with a depressed flange 20, upon which is suitably supported a metal receptacle 61. The receptacle may be secured thereto by any suitable means, such as by screws. Secured to a top portion 62 of the receptacle 61 is a circular member 63, preferably made of an acid resisting material, which is provided with a countersunk circular opening 64, a tapered surface 65, and a shoulder 66. Located in the interior of the receptacle 61 is a layer of asbestos 56 upon which rests a stand 67 for supporting a receptacle to be heated.

The contour of the top surface of the stand 67 is formed or shaped the same as that of the bottom of the receptacle, which it is to support. The upper portion of the stand 67 is provided with a circular flange 68 which is adapted to engage the shoulder 66 of the member 63 to minimize the chance of any foreign substance getting into the receptacle 61. The stand is provided with a circular recess 69 in which is located a plurality of staggered heating elements 27. The heating elements 27 are positioned in correspondingly staggered circular steps 70 in the stand 67 and are held in place therein by a circular clamping member 71 secured to the stand 67 and provided with an opening 72 into which the terminals 35 of the heating elements protrude.

The remainder of this particular embodiment of the invention is practically the same as that of the first described embodiment, with the exception that the conductors 52 are connected to three pairs of terminals instead of one. This particular form of the invention is particularly adapted for heating receptacles containing acids and the like. Furthermore, the heating elements and connections therefore are mounted in an elevated manner similar to that described in the first form of the invention, thereby preventing any acid which might possibly seep through into the internal of the heating device from attacking or corroding the electrical conductors and terminals, or from having any deleterious effects upon the heating elements themselves.

What is claimed is:

1. A heating device comprising a receptacle, a heating element, means for supporting said element within said receptacle to leave a space thereunder for receiving an overflow of material to be heated, a holder operatively positioned with respect to said heating element for containing a substance to be heated, and a passageway extending from said receptacle for removing the overflow of the substance from the holder.

2. In a heating device, a receptacle, an electrical heating element positioned therein, terminals therefor, a container positioned above the heating element and resting partially thereon and designed to contain a substance to be heated, a member for supporting both the heating element and the container having an opening in which the terminals of the heating element protrude, means through which the electrical conductors for the heating element extend to the terminals to which they are connected, and a passageway from said receptacle through which overflow fluid matter from said receptacle may be drained.

3. In a heating device, a casing having an extension on its inner wall, an apertured plate secured to said extension, a receptacle for containing matter to be heated removably mounted within the aperture of said plate, a heating unit supported by said plate directly below said receptacle, a passageway for removing overflow from the receptacle, and a heat insulating material contained in said casing.

4. In a heating device, a casing, a cover secured thereto, a receptacle fastened to said cover, a supporting member located in said receptacle, a heating unit positioned on said member elevated with respect to the bottom of said receptacle, a container carried by the supporting member designed to receive matter to be heated in engagement with said heating unit, and a conduit extending through said casing and said receptacle for electrical conductors connected to said heating unit.

5. In a heating device, a casing equipped with a flange on its inner wall, a cover mounted on and secured to the said flange provided with an opening and equipped with a receptacle for the entrance and support of a supporting member, a heating element positioned thereon and a container located above the heating element and resting partially thereon and partially on the supporting member, a passageway in the supporting element in which terminals of the heating element protrude, and means in which the electrical conductors for the heating element are led into the receptacle up to the terminals to which they are secured.

6. In a heating device, a receptacle, a supporting member positioned therein, a heating element supported thereby, a container resting partially on the heating element and partially on the supporting member, and means for securing the container to the supporting member in such a manner that the container, the heating element and the supporting member can be readily removed from the receptacle as a unit.

7. In a heating device, a receptacle, a supporting member positioned therein, a heating element supported thereby, a container resting partially on the heating element and partially on the supporting member, means for securing the container to the supporting member in such a manner that the container, the heating element and the supporting member can be readily removed from the receptacle as a unit, the said supporting member being equipped with an opening in which terminals of the heating element protrude, and means for leading electrical conductors for the heating element to the terminals thereof to which they are connected, said connections being above the bottom of the receptacle.

8. In a heating device, a receptacle, a supporting member positioned therein, a heating element supported thereby, a container resting partially on the heating element and partially on the supporting member, means for securing the container to the supporting member in such a manner that the container, the heating element and the supporting member can be readily removed from the receptacle as a unit, a passageway in the supporting member in which the terminals of the heating element protrude and are secured to electrical conductors, and means for causing any fluid matter which might accumulate in the receptacle to be drained therefrom.

9. In a heating device, a casing equipped with a pair of flanges one being formed on the outside thereof and adapted to be secured to a support, the other being formed on the inside of the casing, a cover mounted on and secured to the said inner flange provided with an opening and equipped with a receptacle for the entrance and support of a stand, a heating element positioned thereon, a melting pot located above the heating element resting partially thereon and partially on the stand, an infusorial earth positioned between the inner wall of the casing and the outer wall of the receptacle, means including a tube through which the electrical conductors for the heating element are led through the casing into the receptacle, the said stand being provided with an opening in which the terminals of the heating element protrude, and means for securing the ends of electrical conductors to the terminals in the opening in the stand above the bottom of the receptacle.

10. In a heating device, a receptacle, a supporting member positioned therein, a heating element supported thereby, a container resting on the member, and clamping means for retaining the container, the heating element and the supporting member together to effect the removal thereof as a unit from the receptacle.

In witness whereof, I hereunto subscribe my name this 31st day of October, A. D., 1924.

CLAUDE THEODORE SIEBS.